(12) United States Patent
Wu et al.

(10) Patent No.: US 8,619,919 B2
(45) Date of Patent: Dec. 31, 2013

(54) SELECTIVE COHERENT AND NON-COHERENT DEMODULATION METHODS AND APPARATUSES

(75) Inventors: Jie Wu, San Diego, CA (US); Douglas Neal Rowitch, Del Mar, CA (US); Emilija M. Simic, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 12/904,333

(22) Filed: Oct. 14, 2010

(65) Prior Publication Data

US 2012/0093208 A1    Apr. 19, 2012

(51) Int. Cl.
*H04L 27/06* (2006.01)
*H03D 1/04* (2006.01)

(52) U.S. Cl.
USPC .......................................... 375/340; 375/346

(58) Field of Classification Search
USPC ......... 375/316, 322, 324, 325, 326, 340, 343, 375/346
See application file for complete search history.

(56) References Cited

U.S. PATENT DOCUMENTS

| | | | |
|---|---|---|---|
| 4,302,845 A | 11/1981 | McClaughry et al. | |
| 4,860,321 A | 8/1989 | von der Embse | |
| 4,862,482 A | 8/1989 | Patchen | |
| 4,872,170 A | 10/1989 | Fujita | |
| 4,881,059 A | 11/1989 | Saltzberg | |
| 5,170,396 A | 12/1992 | Rivers et al. | |
| 5,295,162 A * | 3/1994 | Zarembowitch | 375/329 |
| 5,296,820 A | 3/1994 | Kawabata | |
| 5,491,713 A | 2/1996 | Kwok et al. | |
| 5,517,530 A | 5/1996 | Gardner | |
| 5,526,357 A | 6/1996 | Jandrell | |
| 5,553,098 A | 9/1996 | Cochran et al. | |
| 5,778,031 A | 7/1998 | Hiramatsu | |
| 5,790,610 A | 8/1998 | Julyan | |
| 5,815,515 A | 9/1998 | Dabiri | |
| 5,928,293 A | 7/1999 | Jobling et al. | |
| 6,088,829 A | 7/2000 | Umemura et al. | |
| 6,121,926 A | 9/2000 | Belcher et al. | |
| 6,195,400 B1 | 2/2001 | Maeda | |

(Continued)

FOREIGN PATENT DOCUMENTS

EP        0453063 A2      10/1991
JP        5183593 A       7/1993

(Continued)

OTHER PUBLICATIONS

Bhanot Sunil., "Implementation and Optimization of a Global Navigation Satellite System Software Radio," Ohio University, Nov. 1998, pp. 1-98. Website: http://www.ohiolink.edu/etd/send-pdf.cgi/Bhanot%20Sunil.pdf'acc_num=ohiou1176840392.

(Continued)

*Primary Examiner* — Sam K Ahn
*Assistant Examiner* — Vineeta Panwalkar
(74) *Attorney, Agent, or Firm* — Linda Gunderson; Mary A. Fales (57) ABSTRACT

Techniques are provided which may be implemented using various methods and/or apparatuses in a receiver of an electronic device to allow for a received signal to be demodulated using both coherent and non-coherent demodulation techniques and for selecting one of the demodulated data signals based, at least in part, on a drift rate measurement of a carrier frequency of the received signal.

80 Claims, 4 Drawing Sheets

(56) References Cited

U.S. PATENT DOCUMENTS

| | | | |
|---|---|---|---|
| 6,211,815 B1* | 4/2001 | Richey et al. | 342/194 |
| 6,297,691 B1 | 10/2001 | Anderson et al. | |
| 6,515,981 B1* | 2/2003 | Schilling et al. | 370/342 |
| 6,567,484 B1 | 5/2003 | Hirota et al. | |
| 6,757,863 B2 | 6/2004 | Kaneshige et al. | |
| 6,977,973 B1 | 12/2005 | Wiggins | |
| 7,073,118 B2 | 7/2006 | Greenberg et al. | |
| 7,174,502 B2 | 2/2007 | Miyamoto | |
| 7,254,201 B2 | 8/2007 | Kim | |
| 7,266,144 B1 | 9/2007 | Sanders | |
| 7,289,589 B2 | 10/2007 | Pawlowski et al. | |
| 7,359,460 B2 | 4/2008 | Schmidt et al. | |
| 7,409,628 B2 | 8/2008 | Tran et al. | |
| 7,469,023 B2 | 12/2008 | Vasana | |
| 7,522,100 B2 | 4/2009 | Yang et al. | |
| 7,533,326 B2 | 5/2009 | Chambers | |
| 7,587,659 B2 | 9/2009 | Tran et al. | |
| 7,673,226 B2 | 3/2010 | Eroz et al. | |
| 7,702,040 B1 | 4/2010 | Yuan et al. | |
| 7,760,880 B2 | 7/2010 | Dave et al. | |
| 7,840,887 B2 | 11/2010 | Pietri et al. | |
| 8,064,351 B2 | 11/2011 | Reid et al. | |
| 2003/0151547 A1 | 8/2003 | Mauro et al. | |
| 2003/0201935 A1 | 10/2003 | King et al. | |
| 2005/0012664 A1 | 1/2005 | Gerein | |
| 2005/0094756 A1 | 5/2005 | Bertram | |
| 2005/0254415 A1* | 11/2005 | Hara | 370/206 |
| 2006/0222058 A1 | 10/2006 | Simic et al. | |
| 2006/0267695 A1 | 11/2006 | Keating | |
| 2007/0044006 A1 | 2/2007 | Yang et al. | |
| 2007/0046534 A1 | 3/2007 | Ziedan et al. | |
| 2007/0076788 A1 | 4/2007 | Jia et al. | |
| 2007/0147483 A1 | 6/2007 | Tang | |
| 2007/0168777 A1 | 7/2007 | Regev et al. | |
| 2007/0205940 A1 | 9/2007 | Yang et al. | |
| 2007/0248152 A1 | 10/2007 | Wang et al. | |
| 2009/0054075 A1 | 2/2009 | Boejer et al. | |
| 2009/0135664 A1 | 5/2009 | Demone | |
| 2009/0135674 A1 | 5/2009 | Matsuzaki | |
| 2010/0134349 A1 | 6/2010 | Lennen et al. | |
| 2011/0314360 A1 | 12/2011 | Raman | |
| 2012/0007777 A1 | 1/2012 | Hammes et al. | |
| 2012/0050096 A1 | 3/2012 | Cheng et al. | |
| 2012/0051402 A1 | 3/2012 | Cheng et al. | |

FOREIGN PATENT DOCUMENTS

| | | |
|---|---|---|
| RU | 2341898 C2 | 12/2008 |
| WO | 9513677 A1 | 5/1995 |
| WO | 9525401 A1 | 9/1995 |
| WO | 9818202 A1 | 4/1998 |
| WO | 03067279 | 8/2003 |
| WO | 2005048521 | 5/2005 |
| WO | 2007054406 A1 | 5/2007 |
| WO | 2008005589 A1 | 1/2008 |

OTHER PUBLICATIONS

International Search Report and Written Opinion—PCT/US2011/056413—ISA/EPO—Feb. 3, 2012.

Nik et al., "Implementation of a Dual-Frequency GLONASS and GPS L1 C/A Software Receiver", The Journal of Navigation (2010), 63, pp. 269-287.

Schmid, et al.: "Combined Galileo/GPS Architecture for Enhanced Sensitivity Reception," AEU International Journal of Electronics and Communications, Elsevier, Jena, DE, vol. 59, No. 5, Jul. 15, 2005, pp. 297-306.

* cited by examiner

SELECTIVE COHERENT AND NON-COHERENT DEMODULATION METHODS AND APPARATUSES

BACKGROUND

1. Field

The subject matter disclosed herein relates to electronic devices, and more particularly to methods and apparatuses for use in or with a device capable of demodulating a received signal.

2. Information

Information transmitted and received in a signal is typically obtained by demodulating the received signal. The performance of a demodulator for obtaining digital data transmitted in a received signal may be evaluated according to a bit error rate (BER). In the demodulation of an RF signal, depending on particular environmental and/or other like characteristics such as noise level and carrier frequency drift, different types of demodulators may perform better than others.

Hence, there is a need for techniques which may provide for or otherwise support reliable, accurate, and/or otherwise robust signal demodulation despite a variety of environmental and/or other like affects.

SUMMARY

In accordance with certain aspects, techniques are provided which may be implemented using various methods and/or apparatuses in a receiver of an electronic device to allow for a received signal to be demodulated using both coherent and non-coherent demodulation techniques and for selecting one of the demodulated data signals based, at least in part, on a drift rate measurement of a carrier frequency of the received signal.

By way of example, in certain implementations a method may comprise demodulating a received signal to extract a first data signal using a coherent demodulator and demodulating the received signal to extract a second data signal using a non-coherent demodulator. The method may further include selectively outputting either the first data signal or the second data signal based, at least in part, on a drift rate measurement of a carrier frequency of the received signal.

In certain further example implementations, the demodulating processes may concurrently performed. In certain further example implementations, a method may also comprise estimating the drift rate measurement of the carrier frequency of the received signal. For example, a drift rate measurement of the carrier frequency of the received signal may be based, at least in part, on a frequency drift rate obtained from a peak processing operation.

In certain further example implementations, a method may also comprise selectively outputting the second data signal in response to the drift rate measurement exceeding a drift rate threshold value. For example, a drift rate threshold value may be selected based, at least in part, on a bit error rate threshold value.

In certain implementations, a method may comprise opening a loop in a coherent demodulator, for example, in response at least in part to the drift rate measurement exceeding a drift rate threshold value, comprises. In certain implementations, a method may comprise closing a loop in a coherent demodulator, for example, in response at least in part to the drift rate measurement not exceeding a drift rate threshold value.

In certain example implementations, a method may comprise selectively outputting either the first data signal or the second data signal further based, at least in part, on a Carrier-to-Noise power ratio associated with the received signal. For example, a given data signal may be output in response to the Carrier-to-Noise power ratio exceeding a Carrier-to-Noise or Signal-to-Noise threshold value. In certain implementations, a method may comprise closing a loop in a coherent demodulator, for example, in response at least in part to a Carrier-to-Noise power ratio exceeding a first Carrier-to-Noise or Signal-to-Noise threshold value. In certain implementations, a method may comprise opening a loop in a coherent demodulator, for example, in response at least in part to a Carrier-to-Noise power ratio not exceeding either a first Carrier-to-Noise or Signal-to-Noise threshold value or a second Carrier-to-Noise or Signal-to-Noise threshold value.

In certain example implementations, a method may comprise identifying a word boundary associated with the first and second data signals to isolate first and second words in respective first and second data signals associated with a word epoch. Hence, for example, a method may selectively output either the first data signal or the second data signal further based, at least in part, on a parity check (e.g., a CRC parity check) against the first and second words. In certain instances, for example, a selected first or second data signal may be output on a word by word basis. In certain example implementations, a method may compare magnitudes of isolated first and second words to possible magnitudes for words received in a word epoch.

In certain example implementations, a method may selectively output either the first data signal or the second data signal further based, at least in part, on whether a loop in a coherent demodulator is currently opened or closed. In certain example implementations, a method may selectively output either the first data signal or the second data signal further based, at least in part, on whether a loop in a non-coherent demodulator is currently opened or closed.

In certain example implementations, a method may determine and/or output information identifying a measure of confidence corresponding to a selectively output first or second data signal.

By way of non-limiting example, a coherent demodulator may comprise a Costas loop, and/or a non-coherent demodulator comprises an Automatic Frequency Control (AFC) loop. By way of non-limiting example, a received signal comprises an SPS signal and/or a communication signal.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some example techniques are presented herein which may be implemented in various method and apparatuses in a device to demodulate one or more received signals.

Information transmitted and received in a signal is typically obtained by demodulating the received signal. The performance of a demodulator for obtaining digital data transmitted in a received signal may be evaluated according to a bit error rate (BER). In the demodulation of an RF signal, depending on particular environmental characteristics such as signal-to-noise level (e.g., a carrier-to-noise level) and carrier frequency drift, different types of demodulators may perform better than others.

In a particular example in the demodulation of a received satellite positioning signal, such as a GNSS signal, to recover a data signal at least two types of demodulators may be used: a "coherent" demodulator and a "non-coherent" demodulator. Here, a coherent demodulator typically tracks the phase of a carrier of the received signal, and exploits that tracked phase in the recovery of symbols in the demodulation process. A non-coherent demodulator does not exploit knowledge of the carrier phase of the received signal. Here, a coherent demodulator may outperform a non-coherent demodulator in some environments while a non-coherent demodulator may outperform a coherent demodulator in other environments. For example, in environments with high thermal noise at a receiver and a stable, non-drifting carrier frequency, a coherent demodulator may outperform a non-coherent demodulator. However, in environments where there is significant carrier drift (e.g., do to Doppler shift caused by range acceleration), coherent demodulators typically become unstable. Accordingly, in such an environment where there is significant carrier drift, non-coherent demodulators typically perform better than coherent demodulators.

In certain example implementations, a receiver may comprise a selectable output demodulation unit having at least two distinct demodulators, namely at least one coherent demodulator and at least one non-coherent demodulator. Both the coherent and non-coherent demodulators may be configured to demodulate the same received signal to provide two different data signals independently. In certain example implementations, the coherent and non-coherent demodulators may be configured to demodulate the same received signal concurrently. While each of the coherent and incoherent demodulators may provide a data signal, one of the data signals may be selected/chosen and/or otherwise output as the final data signal.

In one example implementations, a coherent demodulator may comprise a Costas loop, and/or the like. In one example implementations, a non-coherent demodulator may comprise an Automatic Frequency Control (AFC) loop, and/or the like.

In certain example implementations, a coherent demodulator may comprise a loop which may be selectively opened and closed. In certain example implementations, a non-coherent demodulator may comprise a loop which may be selectively opened and closed. With both opened and closed loops, a demodulator may output a data signal, however, with an opened loop the dynamic parameters are frozen.

In certain example implementations, it may be useful to selectively open a closed loop or close an opened loop in certain situations. For example, it may be useful to close a previously opened loop in a coherent demodulator in response, at least in part, to a frequency drift rate falling below a drift threshold value, and/or a Carrier-to-Noise power ratio exceeding a signal-to-noise threshold value (e.g., carrier-to-noise threshold value). Similarly, it may be useful to open a previously closed loop in a coherent demodulator in response, at least in part, to the frequency drift rate exceeding the same or a different drift threshold value, and/or the Carrier-to-Noise power ratio falling below the same or a different signal-to-noise threshold value.

By way of non-limiting example, an arbitrator circuit and/or other like processing unit may be enabled to selectively open and close one or more loops associated with one or more demodulators and/or other like processing units. For example, a Costas and/or other like loop in a coherent demodulator may be opened in certain situations, for example, to avoid significant undetected word errors. Here, for example, an open/close process may comprise:

(1) if the loop is currently opened and a frequency drift rate (e.g., obtained from a Peak Processing operation, etc.) is less than a drift threshold value of 10.0 Hz/s AND a Carrier-to-Noise power ratio (e.g., a C/No from a Peak Processing operation, etc.) is greater than a signal-to-noise threshold value of 21.0 dBHz, then close the loop; and (2) if the loop is currently closed and the frequency drift rate is greater than a drift threshold value of 12.0 Hz/s OR a Carrier-to-Noise power ratio is less than a signal-to-noise threshold of 20.0 dBHz, then open the loop.

Figure 1:
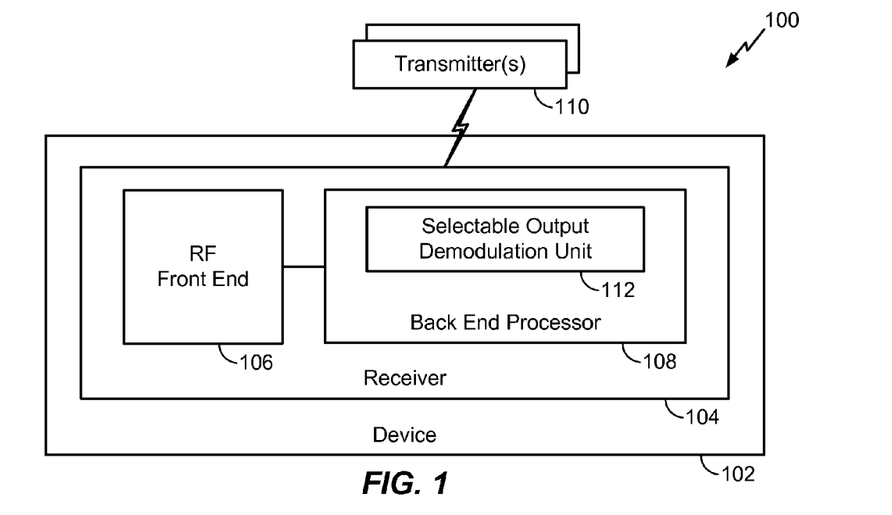
FIG. 1 is a schematic block diagram illustrating an exemplary environment that includes a device to demodulate a received signal, in accordance with an implementation.

With such examples in mind, attention is drawn to FIG. 1, which is a schematic diagram showing an example environment 100 having a device 102 comprising a receiver 104 that is capable of receiving one or more signals transmitted by one or more transmitters 110, in accordance with an example implementation.

Device 102 is representative of any electronic device that may function, at least in part, to receive transmitted signals. By way of example but not limitation, device 102 may comprise a computing and/or communication device such as a mobile telephone, smart phone, lap top computer, tablet computer, a personal computer, a wearable computer, a personal digital assistant, a navigation device, etc.

Transmitter 110 may, for example, transmit an SPS signal, and/or other communication signal.

Device 102 may receive SPS signals from various satellites or the like, which may be from a GPS, Galileo, GLONASS, Compass, or other like GNSS, a system that uses satellites from a combination of these systems, or any SPS developed in the future, each referred to generally herein as a "Satellite Positioning System" (SPS). Thus, by way of further example, in certain implementations device 102 may receive SPS signals associated with a Regional Navigation Satellite System, such as the Quasi-Zenith Satellite System (QZSS), the Indian Regional Navigational Satellite System (IRNSS), and/or the like.

Furthermore, the methods and apparatuses described herein may be used with position location determination systems that utilize pseudolites or a combination of satellites and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with SPS time. Each such transmitter may be assigned a unique PN code so as to permit identification by a remote receiver. Pseudolites may be useful in situations where SPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

Receiver 104 may, for example, comprise an RF front end 106 and a back end 108. In accordance with certain aspects of the present description, receiver 104 may comprise a selectable output demodulation unit 112. In this non-limiting example, selectable output demodulation unit 112 may be provided by or within back end processor 108.

As described in greater detail in the further non-limiting examples below selectable output demodulation unit 112 may comprise at least one coherent demodulator and at least one non-coherent demodulator each of which may provide a data signal based on the same received signal. Selectable output demodulation unit 112 may, for example, select one of the data signals for further processing based, at least in part, on a drift rate measurement of a carrier frequency of the received signal. Selectable output demodulation unit 112 may, for example, also base such selection on one or more other criteria.

Figure 2:
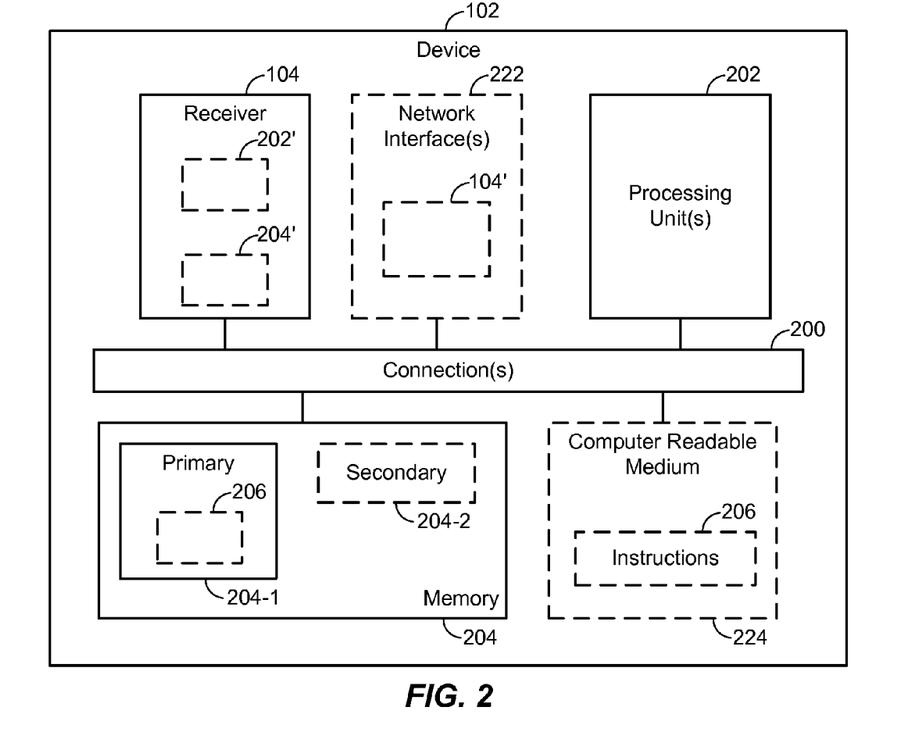
FIG. 2 is a schematic block diagram illustrating certain features of a device, for example as in FIG. 1, in accordance with an implementation.

Attention is drawn next to FIG. 2, which is a schematic diagram showing certain example/optional features that may be provided in a device 102. Here, for example, device 102 may comprise a receiver 104 as mentioned. Receiver 104 may comprise specific circuitry (e.g., analog and/or digital circuitry), and/or programmable logic such as one or more processing units 202' and/or memory 204'. In certain instances, all or part of a receiver may be provided as part of one or more network interfaces 222, e.g., as represented by receiver 104'. In certain example implementations, device 102 may comprise other circuitry to perform various functions. For example, device 102 may comprise one or more processing units 202, memory 204, network interface 222, and/or computer readable medium 224 with computer readable instructions 206, which may be operatively coupled using one or more connections 200.

Processing units 202 may perform data processing (e.g., in accordance with all or part of the techniques provided herein). Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 224. As illustrated, memory 204 and/or computer readable medium 224 may comprise instructions 206 associated with data processing (e.g., in accordance with the techniques provided herein).

Network interface 222 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Figure 3:
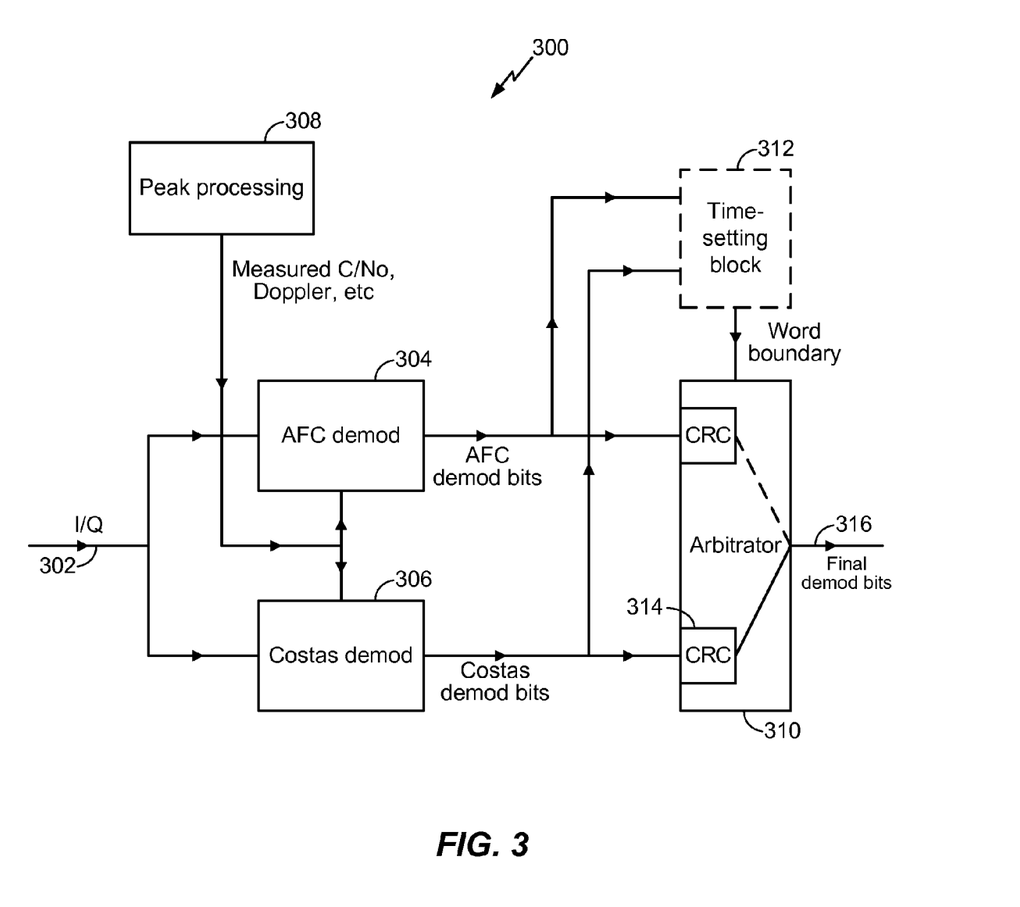
FIG. 3 is a schematic block diagram illustrating an example selectable output demodulation unit in a device, for example as in FIG. 1, in accordance with an implementation.

The schematic diagram In FIG. 3 shows a particular example implementation in a selectable output demodulation unit 300 that may be used in a receiver 104 for recovering a data signal that is used to modulate a received SPS signal. Here, a stream of in-phase and quadrature symbols are provided in digital form at 302, e.g., from an RF front end 106 to AFC demodulator 304 (one example of a non-coherent demodulator), a Costas demodulator 306 (one example of a coherent demodulator).

A peak processing unit/operation 308 may, for example, be used to detect correlation peaks for code phase detections in a received signal, among other things. A measured Carrier-to-Noise power ratio "C/No" and a frequency drift "Doppler" obtained in peak processing unit/operation 308 may be provided to and used by AFC demodulator 304 and Costas demodulator 306.

A time-setting unit/operation 312 may, for example, be employed to detect word boundaries in the data signal used to modulate the received SPS signal using well known techniques (e.g., bit edge detection, a priori knowledge of particular epochs in signal, etc). By way of example, a "word" may comprise a segment of bits for which a correctness may be verified as a whole (e.g., using a sanity check including parity check). Time-setting unit/operation 312 may, for example, identify a word boundary associated with the data signals from AFC demodulator 304 and Costas demodulator 306 (if available) to isolate words in the respective data signals associated with a word epoch.

In this particular example implementation, an arbitrator 310 and/or other like processing unit may apply logic to select a demodulated output data signal from either AFC demodulator 304 or Costas demodulator 306 as a final output data signal at 316. For example, arbitrator 310 may apply any one of several criteria to select between the at least these two different output data signals. For example, in making a selection, arbitrator 310 may consider a drift rate measurement of a carrier frequency of a received signal. For example, arbitrator 310 may select/output the data signal from the AFC demodulator if a drift rate measurement exceeds a drift threshold value. For example, as described herein, in certain implementations, in making a selection arbitrator 310 may consider a Carrier-to-Noise power ratio and a signal-to-noise threshold value. As described herein, in certain implementations, in making a selection arbitrator 310 may consider whether a particular loop in a particular demodulator is currently opened or closed.

In a particular implementation, arbitrator 310 may select and/or output a data signal on a word by word basis. Thus, for example, time-setting unit/operation 312 may provide word boundaries in sequentially received symbols in a demodulated data signal and arbitrator 310 may select a most reliable demodulated word as the final demodulated data signal for a particular word epoch. In a particular implementation, arbitrator 310 may compare magnitudes of isolated words to possible magnitudes for words received in a word epoch.

In certain example implementations, arbitrator 310 may apply and/or otherwise perform a parity check and/or the like, e.g., such as a CRC parity check 314 to each demodulated word. Here, in certain instances, for example, if both parity checks were to fail then both demodulated words may be discarded and hence neither demodulated word output. In certain instances, for example, if one of the demodulated words were to fail the parity check and the other demodulated word were to pass the parity check, then the passing demodulated word may be selected. If both demodulated words were to pass the parity check and the resulting demodulated words have the same value, then arbitrator 310 may select/output either word (e.g., based on further selection criteria, by default, by previous/current settings, etc.).

However, in certain example implementations, if both demodulated words were to pass the parity check but have different values, then only one of the demodulated words may have a correct value and the other demodulated word may be presumed to have an incorrect value. As such, additional criteria may be applied to select a final output data word from the available values. For example, as mentioned, a particular resulting demodulated data word may be selected based upon a drift rate measurement of the carrier frequency.

Figure 4:
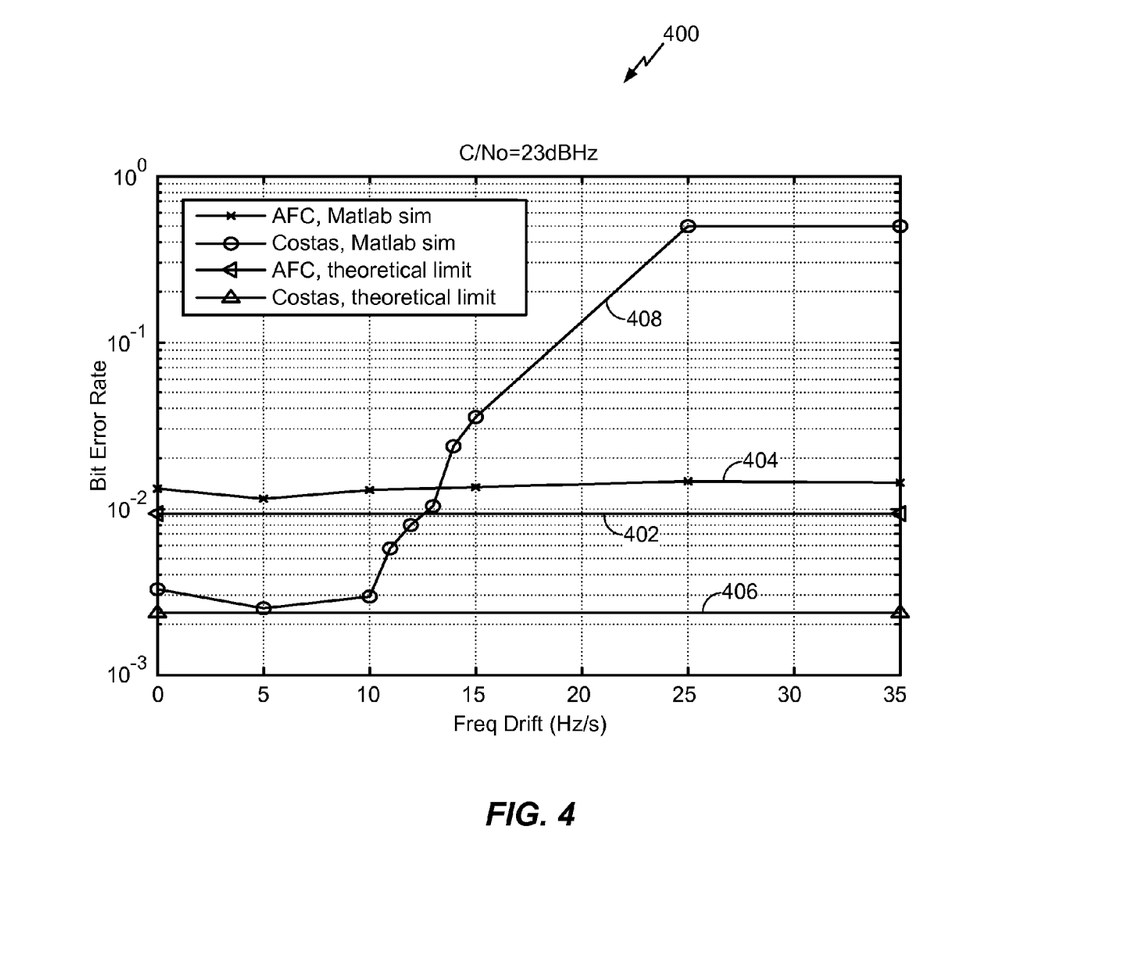
FIG. 4 is a chart illustrating certain example plots based on a simulated device and environment, in accordance with an implementation.

As shown in FIG. 4 and discussed below, a non-coherent demodulator may tend to be more reliable than a coherent demodulator as a drift rate measurement of a carrier frequency increases. Here, as mentioned, a threshold drift rate value may be used to select between such words (e.g., select the data word from a coherent demodulator if a drift rate measurement is below a threshold and select the word from a non-coherent demodulator if the drift rate measurement is above a threshold).

In another example, a demodulated word may only take on certain values or magnitudes given, for example, a priori knowledge of possible magnitudes of the word, previously demodulated words, etc. Accordingly, in certain example implementations, arbitrator 310 may compare magnitudes of the two demodulated words (e.g., passing the parity checks) with possible and/or likely magnitudes to determine which word should be selected as the final output data word for the particular word epoch.

By way of non-limiting example, after word boundary is established, arbitrator 310 may perform a parity check on the demodulated word from both Costas demodulator 306 and AFC demodulator 304, and select the word to output based on all or part of the following logical process:

(1) if the AFC or Costas loop is open, then do not select a demodulated word from the open loop;

(2) if a demodulated word from a closed Costas loop passes parity check AND a demodulated word from an AFC loop fails parity check, then select the demodulated word from the Costas loop;

(3) else, if a demodulated word from a closed AFC loop passes parity check AND a demodulated word from a Costas loop fails parity check, then select the demodulated word from AFC loop;

(4) else, if both words pass parity check AND they are identical, then select either demodulated word;

(5) else, if both words pass parity check AND they are not identical, then select the demodulated word based, at least in part, on an established measure of confidence, then select the word with adequately high enough and/or highest confidence (e.g., above a threshold);

(6) if both words are associated with a relatively low measure of confidence (e.g., less than a threshold), then select the word from the Costas loop if the drift rate measurement is less than a drift rate threshold value or the word from AFC loop if the drift rate measurement is equal to or greater than that a specific drift rate threshold value;

(7) else, if neither word passes parity check, then select either one of the words and identify the failure (e.g., using a failure flag, etc.).

The example graph 400 in FIG. 4 shows four plots 402, 404, 406, and 408, which are based on computer simulations and theory for a modeled receiver configured for use with a GPS signal. The vertical-axis shows the bit error rate and the horizontal-axis shows the frequency drift in Hz/second(s). Plots 402 and 404 are associated with a modeled non-coherent demodulator (e.g., having an AFC loop that is closed) at a constant signal-to-noise level (e.g., C/No=23 dBHZ) but with changing frequency drift rate from 0 to 35 Hz/s. Plot 402 represents an expected theoretical limit and plot 404 represents the simulated results. Plots 406 and 408 are associated with a modeled coherent demodulator (e.g., having a Costas loop that is closed) under the same conditions. Plot 406 represents an expected theoretical limit and plot 408 represents the simulated results.

As shown, plot 404 of the modeled non-coherent demodulator appears fairly horizontal (about the same BER) and therefore may be robust to frequency drift rates, even as large as 35 Hz/s. However, as shown by plot 408, the modeled coherent demodulator starts to degrade in performance when the frequency drift rate reaches about 10 Hz/s, as can be seen by the quickly increasing bit error rate. In this example, at a frequency drift rate of about 13 Hz/s, the performance of the modeled non-coherent demodulator appears to match that of the modeled coherent demodulator, and at frequency drift rates higher than about 13 Hz/s the modeled non-coherent demodulator provides a lower BER than the modeled coherent demodulator.

Thus, in certain example implementations, a drift threshold value may be selected or otherwise identified based, at least in part, in an effort to maintain a bit error rate within a desired range, e.g., associated with a bit error rate threshold value. By way of non-limiting example, for certain particular receivers a drift threshold may relate to a frequency drift rate in a range between about 10.0 Hz/s and about 15.0 Hz/s, or more particularly to about a frequency drift rate of about 12.0 or 13.0 Hz/s. Those skilled in the art will recognize that other receiver and/or different demodulator designs may benefit from different and/or multiple drift threshold values.

Figure 5:
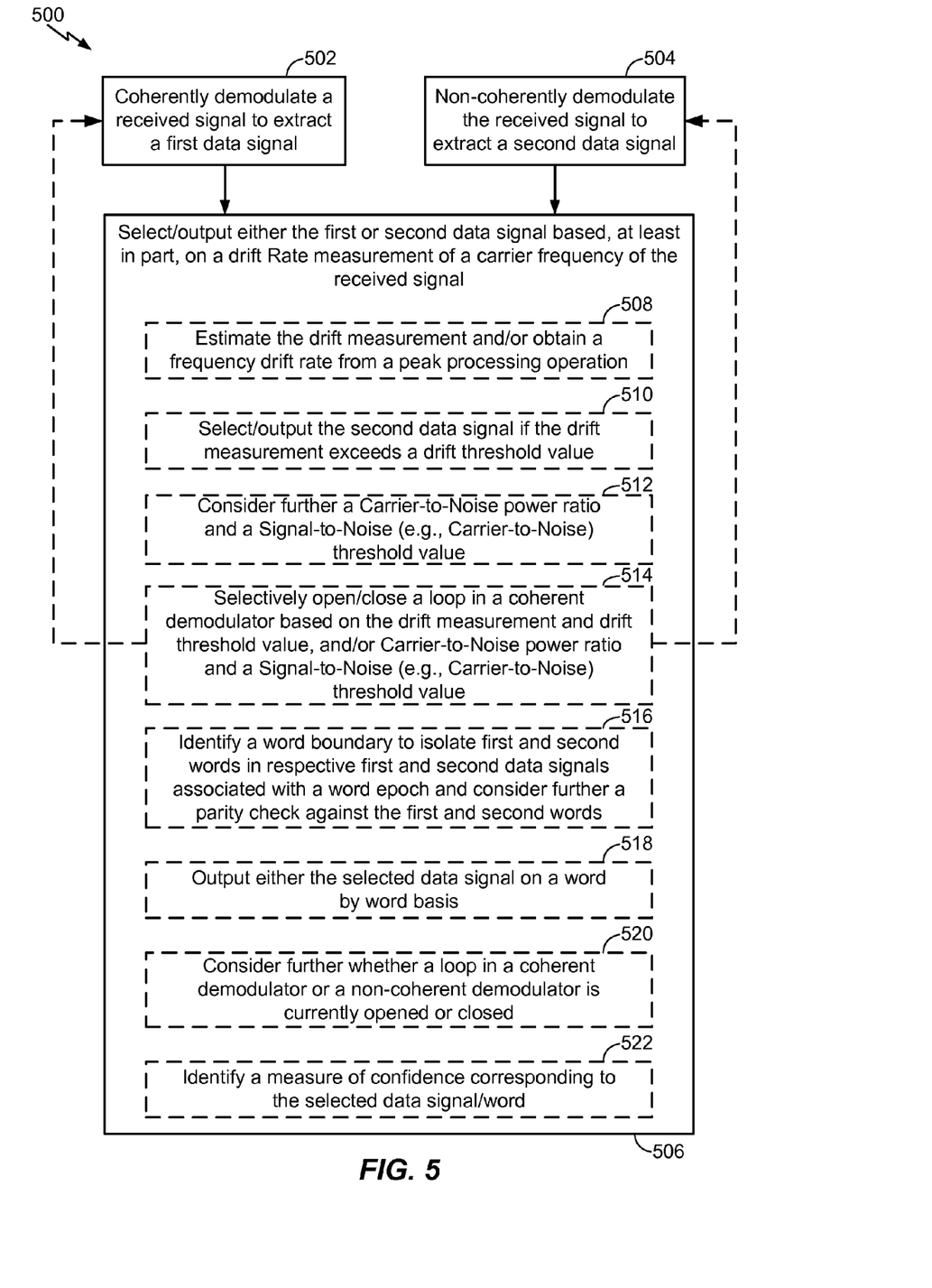
FIG. 5 is a flow diagram illustrating certain features of an exemplary process for use in a device to demodulate a received signal, in accordance with an implementation.

Attention is drawn next to FIG. 5, which shows a process 500 that may be used in a device 102 to support demodulation of a received signal.

At block 502, a received signal may be coherently demodulated to extract a first data signal. At block 504, the received signal may be non-coherently demodulated to extract a second data signal. In certain example implementations, the demodulation of blocks 502 and 504 may be performed concurrently.

At block 506, either the first or second data signals may be selected and/or otherwise selectively output based, at least in part, on a drift rate measurement associated with a carrier frequency of the received signal.

In certain example implementations, at block 508, the drift rate measurement may the estimated using and/or otherwise obtained from a peak processing operation.

In certain example implementations, at block 510, the second data signal may be selected and/or otherwise selectively output in response to a determination that the frequency drift rate measurement exceeds a threshold drift rate value.

In certain example implementations, at block 512, a Carrier-To-Noise power ratio and/or the like may be considered along with one or more signal-to-noise threshold values in determining whether to select/output the first or second data signals.

In certain example implementations, at block 514, a loop in a coherent demodulator may be selectively opened or closed based, at least in part, on a drift rate measurement and at least one drift rate threshold, and/or base, at least in part, on a Carrier-To-Noise power ratio and/or the like along with one or more signal-to-noise threshold values. As illustrated by the dashed arrows from block 514 to blocks 502 and 504, loop opening/closing may be initiated at block 514 to one or more loops used in coherent and/or non-coherent demodulation.

In certain example implementations, at block 516, a word boundary may be identified to isolate first and/or second words in respective first and/or second data signals (as available) associated with a word epoch and/or the like. At block 516, for example, a parity check and/or other like error check/correction process may be performed with and/or against the first and/or second words. The results from such parity check, for example, may be considered in determining whether to select/output the first or second data signals.

In certain example implementations, at block 518, a selected data signal may be output on a word by word basis.

In certain example implementations, at block 520, a determination that a loop in a coherent demodulator and/or non-coherent demodulator may be opened or closed may be considered in determining whether to select/output the first or second data signals.

In certain example implementations, at block 522, a measure of confidence corresponding to a selected/output data signal (word) may be identified. Here, for example, a measure of confidence may be provided to subsequent/other processes, etc. A measure of confidence may correspond to and/or otherwise be related to one or more threshold values. In certain instances, a measure of confidence may be based, at least in part, on bit or word errors that may be undetected but are perceived or otherwise estimated to likely be present at times.

Much of this description is directed towards a particular example, in which an SPS (here, GPS) data signal is being demodulated. It should be understood, however, that similar techniques may be applied to demodulation of other types of SPS signals or other communication signals transmitting data.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying" and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   demodulating a received signal to extract a first data signal using a coherent demodulator;
   demodulating said received signal to extract a second data signal using a non-coherent demodulator; and
   selectively outputting either said first data signal or said second data signal based, at least in part, on a drift rate measurement of a carrier frequency of said received signal.

2. The method as recited in claim 1, wherein demodulating said received signal to extract said first data signal and demodulating said received signal to extract said second data signal are concurrently performed.

3. The method as recited in claim 1, further comprising:
   estimating said drift rate measurement of said carrier frequency of said received signal.

4. The method as recited in claim 3, wherein said drift rate measurement of said carrier frequency of said received signal is based, at least in part, on a frequency drift rate obtained from a peak processing operation.

5. The method as recited in claim 1, wherein said selectively outputting further comprises selectively outputting said second data signal in response to said drift rate measurement exceeding a drift rate threshold value.

6. The method as recited in claim 5, wherein said drift rate threshold value is selected based, at least in part, on a bit error rate threshold value.

7. The method as recited in claim 1, wherein said selectively outputting further comprises outputting information identifying a measure of confidence corresponding to said selectively output first or second data signal.

8. The method as recited in claim 1, wherein said coherent demodulator comprises a Costas loop, and/or said non-coherent demodulator comprises an Automatic Frequency Control (AFC) loop.

9. The method as recited in claim 1, wherein said received signal comprises at least one of a satellite positioning system (SPS) signal, and/or a communication signal.

10. A method comprising:
    demodulating a received signal to extract a first data signal using a coherent demodulator;
    demodulating said received signal to extract a second data signal using a non-coherent demodulator;
    selectively outputting either said first data signal or said second data signal based, at least in part, on a drift rate measurement of a carrier frequency of said received signal; and
    at least one of:
       in response, at least in part, to said drift rate measurement exceeding a drift rate threshold value, opening a loop in said coherent demodulator; or
       in response, at least in part, to said drift rate measurement not exceeding said drift rate threshold value, closing a loop in said coherent demodulator.

11. A method comprising:
    demodulating a received signal to extract a first data signal using a coherent demodulator;
    demodulating said received signal to extract a second data signal using a non-coherent demodulator;
    selectively outputting either said first data signal or said second data signal based, at least in part, on a drift rate measurement of a carrier frequency of said received signal, and a Carrier-to-Noise power ratio associated with said received signal.

12. The method as recited in claim 11, wherein said selectively outputting further comprises selectively outputting said first data signal in response to said Carrier-to-Noise power ratio exceeding a Carrier-to-Noise or Signal-to-Noise threshold value.

13. The method as recited in claim 11, and further comprising at least one of:
    in response, at least in part, to said Carrier-to-Noise power ratio exceeding a first Carrier-to-Noise or Signal-to-Noise threshold value, closing a loop in said coherent demodulator; or
    in response, at least in part, to said Carrier-to-Noise power ratio not exceeding either said first Carrier-to-Noise or Signal-to-Noise threshold value or a second Carrier-to-Noise or Signal-to-Noise threshold value, opening a loop in said coherent demodulator.

14. A method comprising:
    demodulating a received signal to extract a first data signal using a coherent demodulator;
    demodulating said received signal to extract a second data signal using a non-coherent demodulator;
    identifying a word boundary associated with said first and second data signals to isolate first and second words in respective first and second data signals associated with a word epoch; and
    selectively outputting either said first data signal or said second data signal based, at least in part, on a drift rate measurement of a carrier frequency of said received signal, and a parity check against said first and second words.

15. The method as recited in claim 14, wherein said selectively outputting further comprises:
    outputting either said first data signal or the second data signal on a word by word basis.

16. The method as recited in claim 14, wherein said selectively outputting further comprises:
   comparing magnitudes of said isolated first and second words to possible magnitudes for words received in said word epoch.

17. The method as recited in claim 14, wherein said parity check comprises a CRC parity check.

18. The method as recited in claim 14, wherein said selectively outputting further comprises selectively outputting either said first data signal or said second data signal further based, at least in part, on whether a loop in said coherent demodulator is currently opened or closed.

19. The method as recited in claim 14, wherein said selectively outputting further comprises selectively outputting either said first data signal or said second data signal further based, at least in part, on whether a loop in said non-coherent demodulator is currently opened or closed.

20. A method comprising:
   demodulating a received signal to extract a first data signal using a coherent demodulator;
   demodulating said received signal to extract a second data signal using a non-coherent demodulator;
   identifying a word boundary associated with said first and second data signals to isolate first and second words in respective first and second data signals associated with a word epoch; and
   selectively outputting either said first data signal or said second data signal based, at least in part, on a drift rate measurement of a carrier frequency of said received signal; and
   identifying a measure of confidence that corresponds to said selectively output first or second words in said output first or second data signal.

21. An apparatus comprising:
   means for coherently demodulating a received signal to extract a first data signal;
   means for non-coherently demodulating said received signal to extract a second data signal;
   means for selectively outputting either said first data signal or said second data signal based, at least in part, on a drift rate measurement of a carrier frequency of said received signal.

22. The apparatus as recited in claim 21, wherein said means for coherently demodulating said received signal and said means for non-coherently demodulating said received signal operate concurrently.

23. The apparatus as recited in claim 21, further comprising:
   means for estimating said drift rate measurement of said carrier frequency of said received signal.

24. The apparatus as recited in claim 23, wherein said drift rate measurement of said carrier frequency of said received signal is based, at least in part, on a frequency drift rate obtained from a peak processing operation.

25. The apparatus as recited in claim 21, wherein said means for selectively outputting selectively outputs said second data signal in response to a determination that said drift rate measurement exceeds a drift rate threshold value.

26. The apparatus as recited in claim 25, wherein said drift rate threshold value is selected based, at least in part, on a bit error rate threshold value.

27. The apparatus as recited in claim 21, and further comprising:
   means for outputting information identifying a measure of confidence corresponding to said selectively output first or second data signal.

28. The apparatus as recited in claim 21, wherein said means for coherent demodulation comprises means for operating as a Costas loop, and/or said mean for non-coherent demodulation comprises means for operating as an Automatic Frequency Control (AFC) loop.

29. The apparatus as recited in claim 21, wherein said received signal comprises at least one of a satellite positioning system (SPS) signal, and/or a communication signal.

30. An apparatus comprising:
   means for coherently demodulating a received signal to extract a first data signal;
   means for non-coherently demodulating said received signal to extract a second data signal;
   means for selectively outputting either said first data signal or said second data signal based, at least in part, on a drift rate measurement of a carrier frequency of said received signal; and
   at least one of:
      means for selectively opening a closed loop in said means for coherently demodulating said received signal, in response, at least in part, to said drift rate measurement exceeding a drift rate threshold value; and/or
      means for selectively closing an opened loop in said means for coherently demodulating said received signal, in response, at least in part, to said drift rate measurement not exceeding said drift rate threshold value.

31. An apparatus comprising:
   means for coherently demodulating a received signal to extract a first data signal;
   means for non-coherently demodulating said received signal to extract a second data signal;
   means for selectively outputting either said first data signal or said second data signal based, at least in part, on a drift rate measurement of a carrier frequency of said received signal, and a Carrier-to-Noise power ratio associated with said received signal.

32. The apparatus as recited in claim 31, wherein said means for selectively outputting further comprises means for selectively outputting said first data signal in response to said Carrier-to-Noise power ratio exceeding a Carrier-to-Noise or Signal-to-Noise threshold value.

33. The apparatus as recited in claim 31, and further comprising at least one of:
   means for closing an opened loop in said means for coherent demodulation in response, at least in part, to said Carrier-to-Noise power ratio exceeding a first Carrier-to-Noise or Signal-to-Noise threshold value; and/or
   means for opening a closed loop in said means for coherent demodulation in response, at least in part, to said Carrier-to-Noise power ratio not exceeding either said first Carrier-to-Noise or Signal-to-Noise threshold value or a second Carrier-to-Noise or Signal-to-Noise threshold value.

34. An apparatus comprising:
   means for coherently demodulating a received signal to extract a first data signal;
   means for non-coherently demodulating said received signal to extract a second data signal;
   means for identifying a word boundary associated with said first and second data signals to isolate first and second words in respective first and second data signals associated with a word epoch; and
   means for selectively outputting either said first data signal or said second data signal based, at least in part, on a drift rate measurement of a carrier frequency of said received signal, and a parity check against said first and second words.

35. The apparatus as recited in claim 34, wherein said means for selectively outputting further comprises:
means for outputting either said first data signal or the second data signal on a word by word basis.

36. The apparatus as recited in claim 34, wherein said means for selectively outputting further comprises:
means for comparing magnitudes of said isolated first and second words to possible magnitudes for words received in said word epoch.

37. The apparatus as recited in claim 34, wherein said parity check comprises a CRC parity check.

38. The apparatus as recited in claim 34, wherein said means for selectively outputting further selectively outputs either said first data signal or said second data signal further based, at least in part, on whether a loop in said means for coherent demodulation is currently opened or closed.

39. The apparatus as recited in claim 34, wherein said means for selectively outputting further selectively outputs either said first data signal or said second data signal further based, at least in part, on whether a loop in said means for non-coherent demodulation is currently opened or closed.

40. An apparatus comprising:
means for coherently demodulating a received signal to extract a first data signal;
means for non-coherently demodulating said received signal to extract a second data signal;
means for identifying a word boundary associated with said first and second data signals to isolate first and second words in respective first and second data signals associated with a word epoch;
means for selectively outputting either said first data signal or said second data signal based, at least in part, on a drift rate measurement of a carrier frequency of said received signal, and
means for outputting information identifying a measure of confidence that corresponds to said selectively output first or second words in said output first or second data signal.

41. An apparatus comprising:
a receiver to receive a signal; and
a processing unit to obtain a first data signal extracted from said received signal using a coherent demodulator and a second data signal extracted from said received signal using a coherent demodulator, and selectively output either said first data signal or said second data signal based, at least in part, on a drift rate measurement of a carrier frequency of said received signal.

42. The apparatus as recited in claim 41, wherein coherent and non-coherent demodulators operate concurrently.

43. The apparatus as recited in claim 41, said processing unit to operate as at least one of said coherent or said non-coherent demodulators.

44. The apparatus as recited in claim 41, wherein said drift rate measurement of said carrier frequency of said received signal is based, at least in part, on an estimated frequency drift rate.

45. The apparatus as recited in claim 41, said processing unit to selectively output said second data signal in response to a determination that said drift rate measurement exceeds a drift rate threshold value.

46. The apparatus as recited in claim 45, wherein said drift rate threshold value is selected based, at least in part, on a bit error rate threshold value.

47. An apparatus comprising:
a receiver to receive a signal; and
a processing unit to:
obtain a first data signal extracted from said received signal using a coherent demodulator and a second data signal extracted from said received signal using a coherent demodulator; and
selectively output either said first data signal or said second data signal based, at least in part, on a drift rate measurement of a carrier frequency of said received signal, and a Carrier-to-Noise power ratio associated with said received signal.

48. The apparatus as recited in claim 47, said processing unit to selectively output said first data signal in response to said Carrier-to-Noise power ratio exceeding a Carrier-to-Noise or Signal-to-Noise threshold value.

49. The apparatus as recited in claim 47, said processing unit to:
close an opened loop in said coherent demodulator in response, at least in part, to a determination that said Carrier-to-Noise power ratio exceeds a first Carrier-to-Noise or Signal-to-Noise threshold value; and
open a closed loop in said coherent demodulator in response, at least in part, to a determination that said Carrier-to-Noise power ratio does not exceed either said first Carrier-to-Noise or Signal-to-Noise threshold value or a second Carrier-to-Noise or Signal-to-Noise threshold value.

50. The apparatus as recited in claim 41, said processing unit to output information identifying a measure of confidence corresponding to said selectively output first or second data signal.

51. The apparatus as recited in claim 41, wherein said coherent demodulator comprises a Costas loop, and/or said non-coherent demodulator comprises an Automatic Frequency Control (AFC) loop.

52. The apparatus as recited in claim 41, wherein said received signal comprises at least one of a satellite positioning system (SPS) signal, and/or a communication signal.

53. An apparatus comprising:
a receiver to receive a signal; and
a processing unit to:
obtain a first data signal extracted from said received signal using a coherent demodulator and a second data signal extracted from said received signal using a coherent demodulator;
selectively output either said first data signal or said second data signal based, at least in part, on a drift rate measurement of a carrier frequency of said received signal; and
at least one of:
open a closed loop in said coherent demodulator in response, at least in part, to a determination that said drift rate measurement exceeds a drift rate threshold value; or
close an opened loop in said coherent demodulator in response, at least in part, to a determination that said drift rate measurement does not exceed said drift rate threshold value.

54. An apparatus comprising:
a receiver to receive a signal; and
a processing unit to:
obtain a first data signal extracted from said received signal using a coherent demodulator and a second data signal extracted from said received signal using a coherent demodulator;

obtain a word boundary associated with said first and second data signals to isolate first and second words in respective first and second data signals associated with a word epoch; and selectively output either said first data signal or said second data signal based, at least in part, on a drift rate measurement of a carrier frequency of said received signal, and a parity check against said first and second words.

55. The apparatus as recited in claim 54, said processing unit to output either said first data signal or the second data signal on a word by word basis.

56. The apparatus as recited in claim 54, said processing unit to compare magnitudes of said isolated first and second words to possible magnitudes for words received in said word epoch.

57. The apparatus as recited in claim 54, wherein said parity check comprises a CRC parity check.

58. The apparatus as recited in claim 54, said processing unit to selectively output either said first data signal or said second data signal further based, at least in part, on whether a loop in said coherent demodulator is currently opened or closed.

59. The apparatus as recited in claim 54, said processing unit to selectively output either said first data signal or said second data signal further based, at least in part, on whether a loop in said non-coherent demodulator is currently opened or closed.

60. An apparatus comprising:
a receiver to receive a signal; and
a processing unit to:
   obtain a first data signal extracted from said received signal using a coherent demodulator and a second data signal extracted from said received signal using a coherent demodulator;
   obtain a word boundary associated with said first and second data signals to isolate first and second words in respective first and second data signals associated with a word epoch;
   selectively output either said first data signal or said second data signal based, at least in part, on a drift rate measurement of a carrier frequency of said received signal; and
   selectively output information identifying a measure of confidence that corresponds to said selectively output first or second words in said output first or second data signal.

61. An article comprising:
a non-transitory computer readable medium having stored therein computer-implementable instructions executable by one or more processing units to:
   obtain a first data signal extracted from a received signal to using a coherent demodulator;
   obtain a second data signal extracted from said received signal to using a non-coherent demodulator; and
   select either said first data signal or said second data signal for further processing based, at least in part, on a drift rate measurement of a carrier frequency of said received signal.

62. The article as recited in claim 61, wherein coherent and non-coherent demodulators operate concurrently.

63. The article as recited in claim 61, said computer-implementable instructions being further executable by said one or more processing units to operate as at least one of said coherent or said non-coherent demodulators.

64. The article as recited in claim 61, wherein said drift rate measurement of said carrier frequency of said received signal is based, at least in part, on a frequency drift rate obtained from a peak processing operation.

65. The article as recited in claim 61, said computer-implementable instructions being further executable by said one or more processing units to select said second data signal in response, at least in part, to a determination that said drift rate measurement exceeding a drift rate threshold value.

66. The article as recited in claim 65, wherein said drift rate threshold value is selected based, at least in part, on a bit error rate threshold value.

67. The article as recited in claim 61, said computer-implementable instructions being further executable by said one or more processing units to:
   obtain a word boundary associated with said first and second data signals to isolate first and second words in respective first and second data signals associated with a word epoch, and
   wherein select either said first data signal or said second data signal further based, at least in part, on a parity check against said first and second words.

68. The article as recited in claim 67, said computer-implementable instructions being further executable by said one or more processing units to output either said first data signal or the second data signal on a word by word basis.

69. The article as recited in claim 67, said computer-implementable instructions being further executable by said one or more processing units to:
   compare magnitudes of said isolated first and second words to possible magnitudes for words received in said word epoch.

70. The article as recited in claim 67, wherein said parity check comprises a CRC parity check.

71. The article as recited in claim 67, said computer-implementable instructions being further executable by said one or more processing units to select either said first data signal or said second data signal further based, at least in part, on whether a loop in said coherent demodulator is currently opened or closed.

72. The article as recited in claim 67, said computer-implementable instructions being further executable by said one or more processing units to select either said first data signal or said second data signal further based, at least in part, on whether a loop in said non-coherent demodulator is currently opened or closed.

73. The article as recited in claim 61, said computer-implementable instructions being further executable by said one or more processing units to establish information identifying a measure of confidence corresponding to said selectively output first or second data signal.

74. The article as recited in claim 61, wherein said coherent demodulator comprises a Costas loop, and/or said non-coherent demodulator comprises an Automatic Frequency Control (AFC) loop.

75. The article as recited in claim 61, wherein said received signal comprises at least one of a satellite positioning system (SPS) signal, and/or a communication signal.

76. An article comprising:
a non-transitory computer readable medium having stored therein computer-implementable instructions executable by one or more processing units to:
   obtain a first data signal extracted from a received signal to using a coherent demodulator;
   obtain a second data signal extracted from said received signal to using a non-coherent demodulator;

select either said first data signal or said second data signal for further processing based, at least in part, on a drift rate measurement of a carrier frequency of said received signal; and
at least one of:
in response, at least in part, to a determination that said drift rate measurement exceeds a drift rate threshold value, open a closed loop in said coherent demodulator; or
in response, at least in part, to a determination that said drift rate measurement does not exceed said drift rate threshold value, close an opened loop in said coherent demodulator.

77. An article comprising:
a non-transitory computer readable medium having stored therein computer-implementable instructions executable by one or more processing units to:
obtain a first data signal extracted from a received signal to using a coherent demodulator;
obtain a second data signal extracted from said received signal to using a non-coherent demodulator; and
select either said first data signal or said second data signal based, at least in part, on a drift rate measurement of a carrier frequency of said received signal, and a Carrier-to-Noise power ratio associated with said received signal.

78. The article as recited in claim 77, said computer-implementable instructions being further executable by said one or more processing units to select said first data signal in response, at least in part, to a determination that said Carrier-to-Noise power ratio exceeds a Carrier-to-Noise or Signal-to-Noise threshold value.

79. The article as recited in claim 77, said computer-implementable instructions being further executable by said one or more processing units to:
in response, at least in part, to a determination that said Carrier-to-Noise power ratio exceeds a first Carrier-to-Noise or Signal-to-Noise threshold value, close an opened loop in said coherent demodulator; or
in response, at least in part, to a determination that said Carrier-to-Noise power ratio does not exceed either said first Carrier-to-Noise or Signal-to-Noise threshold value or a second Carrier-to-Noise or Signal-to-Noise threshold value, open a closed loop in said coherent demodulator.

80. An article comprising:
a non-transitory computer readable medium having stored therein computer-implementable instructions executable by one or more processing units to:
obtain a first data signal extracted from a received signal to using a coherent demodulator;
obtain a second data signal extracted from said received signal to using a non-coherent demodulator;
obtain a word boundary associated with said first and second data signals to isolate first and second words in respective first and second data signals associated with a word epoch;
select either said first data signal or said second data signal for further processing based, at least in part, on a drift rate measurement of a carrier frequency of said received signal; and
establish information identifying a measure of confidence that corresponds to said selected first or second words in said selected first or second data signal.

* * * * *